United States Patent
Swayambhu et al.

(10) Patent No.: US 9,667,367 B2
(45) Date of Patent: May 30, 2017

(54) CONTENT PERSONALITY CLASSIFIER

(75) Inventors: Krithika Swayambhu, Chennai (IN); Aveek Mukhopadhyay, New Delhi (IN); Suman Mukherjee, Dhanbad (IN); Vijay Prabhu Baskaran, Chennai (IN); Jubish Cheriya Parambath, Chennai (IN); Anand N. Sankaran, Chennai (IN)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1360 days.

(21) Appl. No.: 13/150,291

(22) Filed: Jun. 1, 2011

(65) Prior Publication Data

US 2012/0311619 A1    Dec. 6, 2012

(51) Int. Cl.
| | |
|---|---|
| *H04H 60/46* | (2008.01) |
| *H04H 60/45* | (2008.01) |
| *H04N 21/442* | (2011.01) |
| *H04N 21/45* | (2011.01) |
| *H04N 21/466* | (2011.01) |
| *H04N 21/475* | (2011.01) |

(52) U.S. Cl.
CPC ............ *H04H 60/46* (2013.01); *H04H 60/45* (2013.01); *H04N 21/44222* (2013.01); *H04N 21/4532* (2013.01); *H04N 21/4667* (2013.01); *H04N 21/4756* (2013.01)

(58) Field of Classification Search
CPC ......... H04N 21/44222; H04N 21/4532; H04N 21/4667; H04N 21/4756; H04H 60/46; H04H 60/45
USPC ....................... 725/9–21, 61; 705/7.11, 7.29; 434/322–364
See application file for complete search history.

(56) References Cited

U.S. PATENT DOCUMENTS

| | | | | |
|---|---|---|---|---|
| 4,996,642 | A * | 2/1991 | Hey .............................. | 705/7.29 |
| 6,918,132 | B2 * | 7/2005 | Gargi ............................ | 725/45 |
| 7,421,725 | B2 * | 9/2008 | Hane et al. .................... | 725/46 |
| 2002/0045154 | A1 * | 4/2002 | Wood et al. .................. | 434/350 |
| 2002/0199194 | A1 * | 12/2002 | Ali ................................ | 725/46 |
| 2003/0036899 | A1 * | 2/2003 | Leslie et al. .................... | 704/2 |
| 2007/0245379 | A1 * | 10/2007 | Agnihortri ...................... | 725/46 |
| 2008/0154899 | A1 * | 6/2008 | Carmony .......................... | 707/6 |

* cited by examiner

*Primary Examiner* — Nathan Flynn
*Assistant Examiner* — Patrick A Ryan

(57) ABSTRACT

A method including identifying a customer when the customer uses a television service; storing contents that are each tagged with a Myers-Briggs Type Indicator or one or more personality characteristics pertaining to a Myers-Briggs Type Indicator; selecting contents from the stored contents; providing a user interface to permit the customer to choose from a selection of the stored contents to rate; receiving ratings of a chosen contents from the customer; identifying the customer's Myers-Briggs Type Indicator based on the received ratings; and providing the customer's Myers-Briggs Type Indicator to the customer.

1 Claim, 10 Drawing Sheets

CONTENT PERSONALITY CLASSIFIER

BACKGROUND

Service providers (SPs) are continually trying to improve customer relationship management (CRM) systems. CRM systems may enhance the quality of service provided by service providers as well as improve customer experience and satisfaction.

DETAILED DESCRIPTION OF PREFERRED EMBODIMENTS

Figure 1:
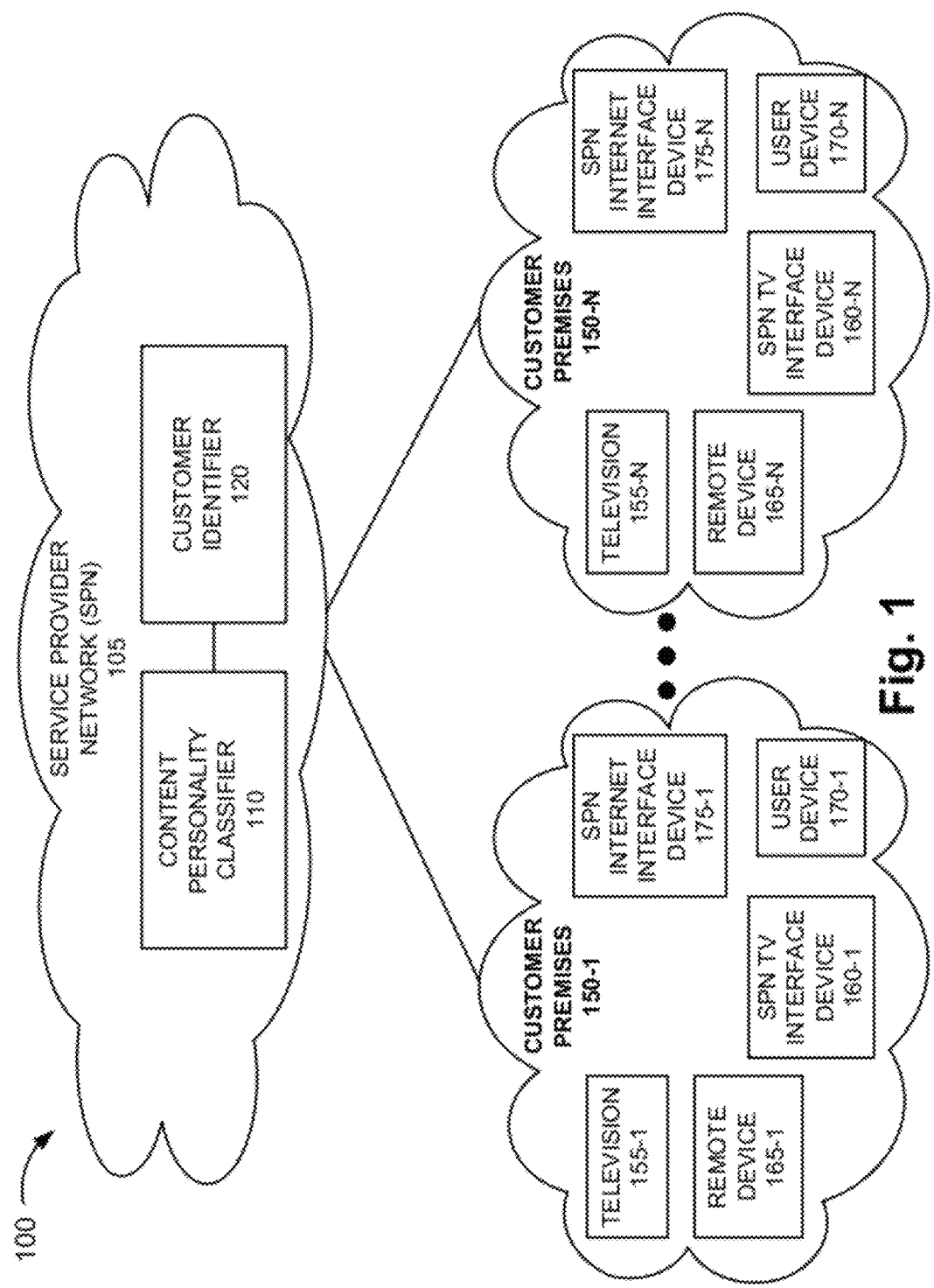
FIG. 1 is a diagram illustrating an exemplary environment in which an exemplary embodiment of a content personality classifier may be implemented.

The following detailed description refers to the accompanying drawings. The same reference numbers in different drawings may identify the same or similar elements. Also, the following detailed description does not limit the invention.

The term "content" or "contents," as used herein, is intended to be broadly interpreted to include, for example, visual data, audio data, a combination of audio data and visual data, or other forms of media content. By way of example, content may include television content and Internet content. Television content may include, for example, movies, video-on-demand (VoD) content, premium channel content, and pay-per-view (PPV) content. Additionally, the television content may include television shows or other types of television programming. Internet content may include podcasts, web sites, etc. The content may be in various formats, such as, for example, standard definition, high-definition, 3-D, etc.

The Myers-Briggs Type Indicator (MBTI) represents a personality type based on the following selection of characteristics: Introversion (I), Extraversion (E), Sensing (S), Intuition (N), Thinking (T), Feeling (F), Judging (J), and Personality (P). There are a total of sixteen different personality types (i.e., MBTIs) commonly known as ISTJ, ISFJ, INFJ, INTJ, ISTP, ISFP, INFP, INTP, ESTP, ESFP, ENFP, ENTP, ESTJ, ESFJ, ENFJ, and ENTJ. Typically, a person is administered a test (e.g., a series of forced-choice questions) to determine the appropriate Myers-Briggs Type Indicator for the person.

According to an exemplary embodiment, a content personality classifier may correlate content with a particular Myers-Briggs Type Indicator. For example, contents (e.g., movies, etc.) may be tagged with Myers-Briggs Type Indicators (e.g., ISTJ, etc.) based on, for example, the plot of the contents, scenes occurring in the contents, the genre and/or sub-genre of the contents, and/or the theme(s) of the contents. According to an exemplary embodiment, content personality classifier may present customers with images representative of the tagged contents. For example, the images may be posters or some other graphical images (e.g., thumbnail images, etc.) and/or textual representations (e.g., titles of the contents). The images may represent contents the customers have seen or not seen. The customers may be asked to rate the images (e.g., a numerical scale, such as a number of stars, etc.) and based on the customers' ratings and the Myers-Briggs Type Indicators associated with the rated contents, the content personality classifier may identify the Myers-Briggs Type Indicators of the customers. The content personality classifier may then reveal to the customers their Myers-Briggs Type Indicators.

According to an exemplary embodiment, the content personality classifier may provide the Myers-Briggs Type Indicators of customers to a content recommendation engine to assist in recommending content to customers. In this way, the content recommendation engine may provide a personality-based recommendation of content. Additionally, or alternatively, according to an exemplary embodiment, the customers may be permitted to have their Myers-Briggs Type Indicators published and available to other customers and allow the customers to socially interact based on their Myers-Briggs Type Indicators. By way of example, customers may be able to form customer groups to interact and recommend contents to one another (e.g., customers having the same or similar MBTIs), form customer groups to discuss various topics, and/or form customer groups to make friends, share interests, etc.

FIG. 1 is a diagram illustrating an exemplary environment 100 in which an exemplary embodiment of a content personality classifier may be implemented. As illustrated in FIG. 1, environment 100 may include a service provider network (SPN) 105 and customer premises 150-1 through 150-N (referred to as customer premises 150). Service provider network 105 may include, among other devices, a content personality classifier 110 and a customer identifier 120. Customer premises 150 may include, among other devices, televisions (TVs) 155-1 through 155-N (referred to generally as TV 155 or TVs 155), SPN TV interface devices 160-1 through 160-N (referred to generally as SPN TV interface device 160 or SPN TV interface devices 160), remote devices 165-1 through 165-N (referred to generally as remote device 165 or remote devices 165), user devices 170-1 through 170-N (referred to generally as user device 170 or user devices 170), and SPN Internet interface devices 175-1 through 175-N (referred to generally as SPN Internet interface device 175 or SPN Internet interface devices 175).

The number of devices and networks, and the configuration in environment 100 are exemplary and provided for simplicity. According to other embodiments, environment 100 may include additional devices, fewer devices, different devices, and/or differently arranged devices, than those illustrated in FIG. 1. For example, SPN TV interface device 160 and TV 155 may be implemented as a part of user device 170. Additionally, or alternatively, for example, customer premises 150 may not include one or more of TV 155, SPN TV interface device 160, remote device 165, user device 170, or SPN Internet interface device 175.

Additionally, or alternatively, according to other embodiments, environment 100 may include additional networks, fewer networks, and/or differently arranged networks, than those illustrated in FIG. 1. For example, customer premises 150 may include a local area network (LAN). Also, according to other embodiments, one or more functions and/or processes described as being performed by a particular device may be performed by a different device, or some combination of devices. By way of example, one or more functions and/or processes described as being performed by customer identifier 120 may be performed by content personality classifier 110. Environment 100 may include wired and/or wireless connections among the devices illustrated.

Service provider network 105 may include a network that distributes or makes available a service, such as, television service. Service provider network 105 may also include a network that distributes or makes available Internet service and/or mobile service. Service provider network 105 may be implemented as a satellite network and/or a terrestrial network. Although not illustrated, service provider network 105 may include, for example, content distribution devices, content storage devices, application servers, billing devices, security devices, etc.

Content personality classifier 110 may identify the Myers-Briggs Type Indicators for customers based on contents tagged with Myers-Briggs Types Indicators or one or more personality characteristics included in the Myers-Briggs Type Indicators (e.g., Introversion (I), Extraversion (E), etc.). According to an exemplary embodiment, content personality classifier 110 may be accessed by customers via user interfaces associated with a television service provided by service provider network 105. For example, a customer may access user interfaces pertaining to content personality classifier 110 via a widget, via a menu system pertaining to PPV or VoD, or via some other television programming menu. According to an exemplary embodiment, content personality classifier 110 may identify a customer's personality (i.e., their Myers-Briggs Type Indicator) based on contents, such as movies. According to other embodiments, content personality classifier 110 may identify a customer's Myers-Briggs Type Indicator based on other forms of content (e.g., television shows, television series, etc.). Additionally, or alternatively, according to other embodiments, content personality classifier 110 may be implemented within other types of service, such as, Internet service or mobile service. As an example, content personality classifier 110 may be implemented on a web site, which may accessible to customers via Internet service, and may or may not be accessible via a television service.

Content personality classifier 110 may provide user interfaces to allow customers to rate contents. These contents may be contents the customers have viewed or not viewed. Based on the ratings of contents received by the customers, and the tags associated with the contents, content personality classifier 110 is able to identify the customers' Myers-Briggs Type Indicators. As described further below, content personality classifier 110 may provide the customers' Myers-Briggs Type Indicators to, for example, a content recommendation engine (not illustrated) and/or a customers' group web site (not illustrated).

Customer identifier 120 may identify a customer. Customer identifier 120 may provide the identity of the customer to content personality classifier 110. Depending on the devices used by the customer to access and use the service(s) provided by service provider network 105, customer identifier 120 may identify the customer automatically or based on a manual log-in. Customer identifier 120 may be implemented by one or multiple devices. For example, customer identifier 120 may include a computational device (e.g., a computer, a server, etc.). Customer identifier 120 will be described further below.

Customer premises 150 may include a location where customer(s) receive services from service provider network 105. For example, customers may receive services at home, at work, or locations while customers are mobile. As illustrated, customer premises 150 may include devices that allow customers to receive services, such as, for example, television and Internet from service provider network 105. As illustrated, customer premises 150 may include exemplary customer premise equipment, such as, for example, TVs 155, SPN TV interface devices 160, remote devices 165, user devices 170, and SPN Internet interface devices 175.

TV 155 may include a device to display content. According to an exemplary embodiment, TV 155 may correspond to a television. According to other embodiments, TV 155 may correspond to other types of display devices, such as, for example, a monitor, a mobile device having a display, a laptop computer, user device 170, etc. According to an exemplary embodiment, TV 155 and SPN TV interface device 160 may be separate devices, as illustrated in FIG. 1. According to other embodiments, TV 155 may include SPN TV interface device 160 or include some of the functionalities associated with SPN TV interface device 160.

SPN TV interface device 160 may include a device that communicates with service provider network 105 to provide television services and/or content to a customer. According to an exemplary embodiment, SPN TV interface device 160 may include a client, a thin client, a set-top box, a converter box, a receiver, a server, a peer device, a tuner, and/or a digibox. According to an exemplary embodiment, SPN TV interface device 160 may also include a digital video recorder (DVR) and/or a hard drive. SPN TV interface device 160 may also provide multi-room services.

Remote device 165 may include a device that communicates with TV 155 and/or SPN TV interface device 160 to allow a customer to interact with SPN TV interface device 160 and/or TV 155. Remote device 165 may also include a device that communicates with other devices in communication with TV 155 and/or SPN TV interface device 160. Remote device 165 may include one or multiple input mechanisms (e.g., buttons, a display, a touchpad, a microphone, etc.) to receive a customer's input and, among other things, allow the customer to interact with TV 155 and/or SPN TV interface device 160. For example, remote device 165 may correspond to a remote control device (e.g., a set-top box controller, a TV controller, a converter box controller, etc.).

User device 170 may include, for example, a mobile device, a stationary device, a handheld device, a tablet device, or some other type of portable device. For example, user device 170 may include a computational device (e.g., a desktop computer, a laptop computer, a palmtop computer, etc.), or a communication device (e.g., a wireless phone, a wired phone, an Internet-access device, etc.). User device 170 may be capable of communicating with one or more devices in customer premises 150 and/or service provider network 105. Additionally, as previously described, user device 170 may include one or more of the devices described in customer premises 150, such as, for example, TV 155, SPN TV interface 160, etc.

SPN Internet interface device 175 may include a device that communicates with service provider network 105 to provide Internet services and/or Internet content to a customer. SPN Internet interface device 175 may also communicate with other devices associated with customer premises 150. For example, SPN Internet interface device 175 may include a modem, a wireless router, a wired router, a gateway, or some other type of communication device.

Figure 2:
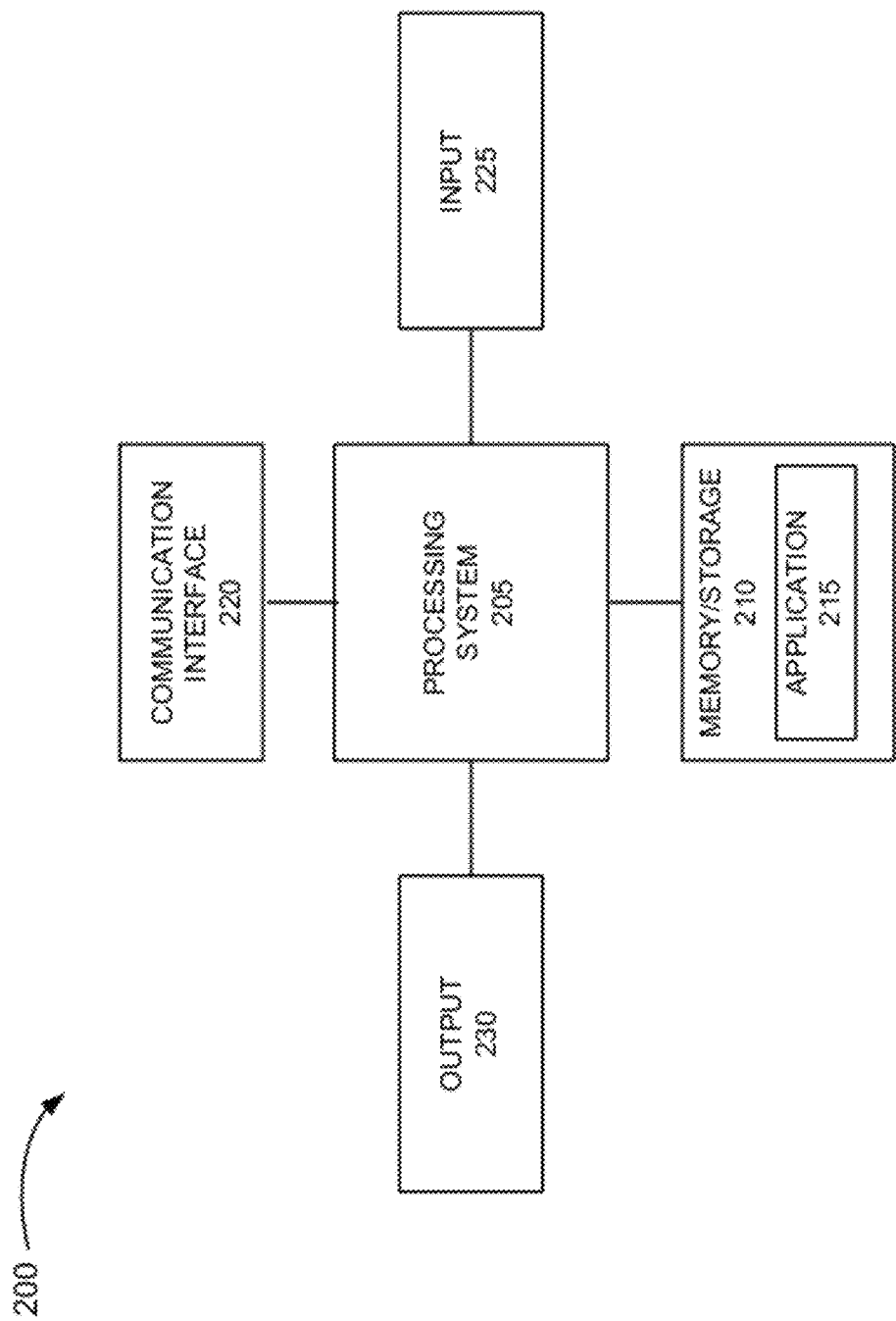
FIG. 2 is a diagram illustrating exemplary components of a device that may correspond to one or more of the devices in the environment depicted in FIG. 1.

FIG. 2 is a diagram illustrating exemplary components of a device 200 that may correspond to one or more of the devices in environment 100. For example, device 200 may correspond to one or more devices in service provider network 105 (e.g., content personality classifier 110, customer identifier 120) and/or customer premises 150 (e.g., SPN TV interface device 160, user device 170, SPN Internet interface device 175, etc.). As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SOCs), central processing units, microcontrollers, and/or some other component that may interpret and/or execute instructions and/or data. Depending on the type of processing system 205, processing system 205 may be implemented as hardware, a combination of hardware and software, may include a memory (e.g., memory/storage 210), etc.

Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) or a floppy disk (e.g., a zip disk, etc.) and a corresponding drive, a tape, a Micro-Electromechanical System (MEMS)-based storage medium, and/or a nanotechnology-based storage medium. Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 210 may store data, application(s), and/or instructions related to the operation of device 200. Memory/storage 210 may store data, application(s), and/or instructions related to the operation of device 200.

Application 215 may include software or a program that provides various services and/or functions. For example, with reference to content personality classifier 110, application 215 may include a personality classifier application or program for identifying the Myers-Briggs Type Indicators of customers. Additionally, for example, with reference to customer identifier 120, application 215 may include a customer identifier application or program for identifying a customer. Additionally, for example, with reference to SPN TV interface device 160, application 215 may include an application or a program for providing content via TV 155, provide user interfaces, etc. Similarly, with reference to user device 170, application 215 may include an application or a program for providing content, user interfaces, etc.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

As previous described, content personality classifier 110 may identify a Myers-Briggs Type Indicator of a customer. According to an exemplary embodiment, content personality classifier 110 may use data and/or information that correlate contents with Myers-Briggs Type Indicators. According to an exemplary embodiment, the identification of a particular Myers-Briggs Type Indicator to a particular content may be derived based on metadata associated with the particular content. For example, the metadata may include plot information, genre information, sub-genre information, title information, and/or theme information. The metadata may be analyzed (e.g., identifying word(s), phrase(s), etc.) and mapped to one or more Myers-Briggs Type Indicators. Additionally, or alternatively, according to an exemplary embodiment, administrators may assign Myers-Briggs Type Indicators to contents that are used as criteria for identifying customers' Myers-Briggs Type Indicators.

According to an exemplary embodiment, content personality classifier 110 may derive the Myers-Briggs Type Indicators for contents. Alternatively, other devices may derive the Myers-Briggs Type Indicators for contents and make this data and/or information available to content personality classifier 110.

Figure 3:
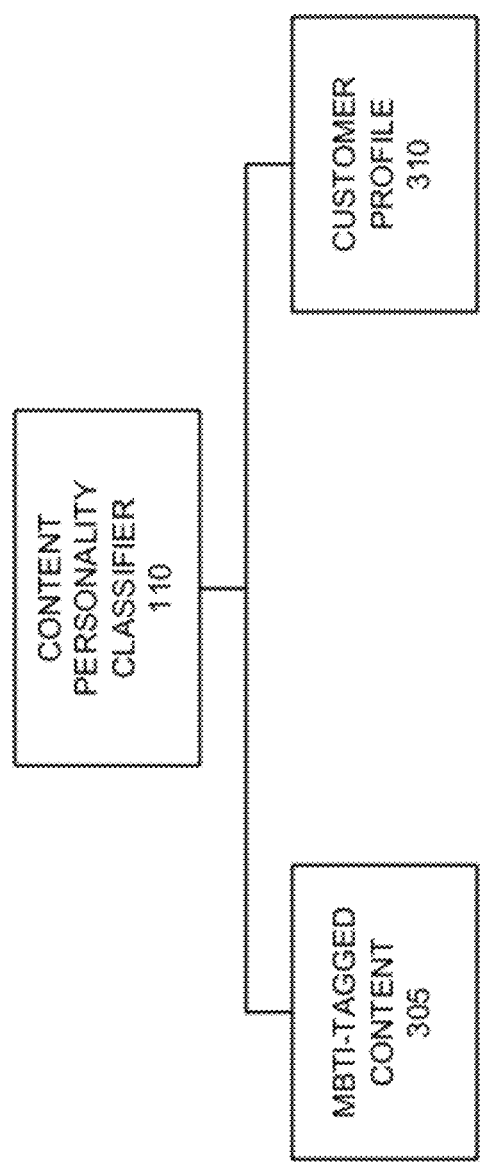
FIG. 3 is a diagram illustrating repositories of data and/or information that may be used by an exemplary embodiment of the content personality identifier.
Figure 4:
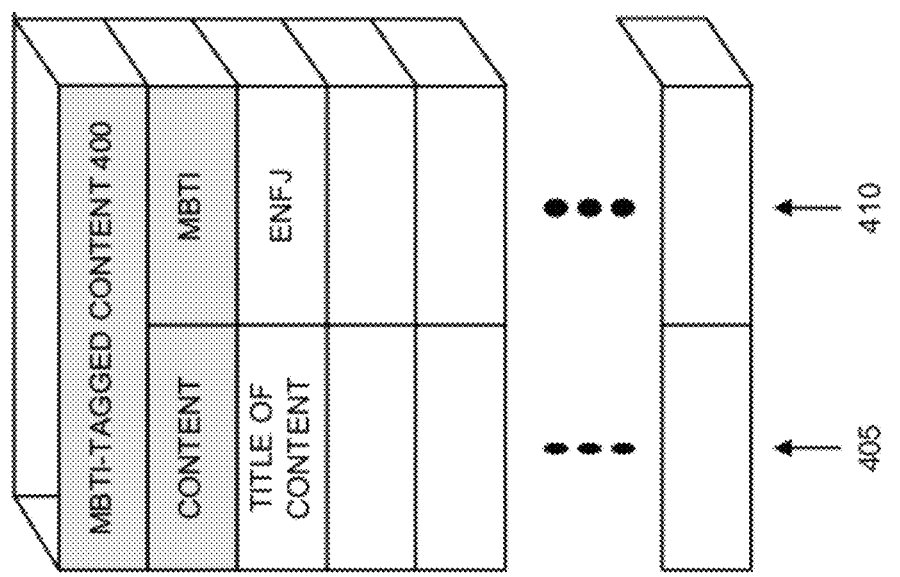
FIG. 4 is a diagram illustrating exemplary Myers-Briggs Type Indicator (MBTI)-tagged content information.

FIG. 3 is a diagram illustrating repositories of data and/or information that may be used by content personality identifier 110. For example, according to an exemplary embodiment, content personality classifier 110 may use an MBTI-tagged content repository 305 and a customer profile repository 310. MBTI-tagged content repository 305 may store data and/or information pertaining to contents and their corresponding Myers-Briggs Type Indicators. FIG. 4 is a diagram illustrating an exemplary MBTI-tagged content database 400. As illustrated, MBTI-tagged content database 400 may include a content field 405 and an MBTI field 410. According to other implementations, MBTI-tagged content database 400 may include additional fields, fewer fields, or different fields. For example, MBTI-tagged content database 400 may include a personality characteristic field that indicates one or more of the characteristics: Introversion (I), Extraversion (E), Sensing (S), Intuition (N), Thinking (T), Feeling (F), Judging (J), and Personality (P), instead of a Myers-Briggs Type Indicator, as the personality characteristic(s) pertain(s) to contents. Additionally, or alternatively, MBTI-tagged content database 400 may include a weight field to indicate the strength of correlation between the characteristic(s) or the Myers-Briggs Type Indicator and the content. In other words, one content may be considered a stronger indicator of a personality characteristic (e.g., "Thinking") or an MBTI (e.g., ESTP) than another content, which may also be considered an indicator of the personality characteristic "Thinking" or the MBTI "ESTP." While MBTI-tagged content database 400 is depicted as a table, according to other implementations, MBTI-tagged content database 400 may take the form of some other type of data structure.

Content field 405 may include a string (e.g., an alphabetic string, or some other type of string (e.g., a numeric string, an alphanumeric string, etc.)) that identifies a particular content. For example, the string may indicate the title of the content.

MBTI field 410 may include a string (e.g., an alphabetic string, or some other type of string (e.g., a numeric string, an alphanumeric string, etc.)) that identifies a particular Myers-Briggs Type Indicator. Alternatively, MBTI-field 410 may include a string that identifies one or more of the personality characteristics (e.g., Introversion, etc.) that are included in a Myers-Briggs Type Indicator.

Figure 5:
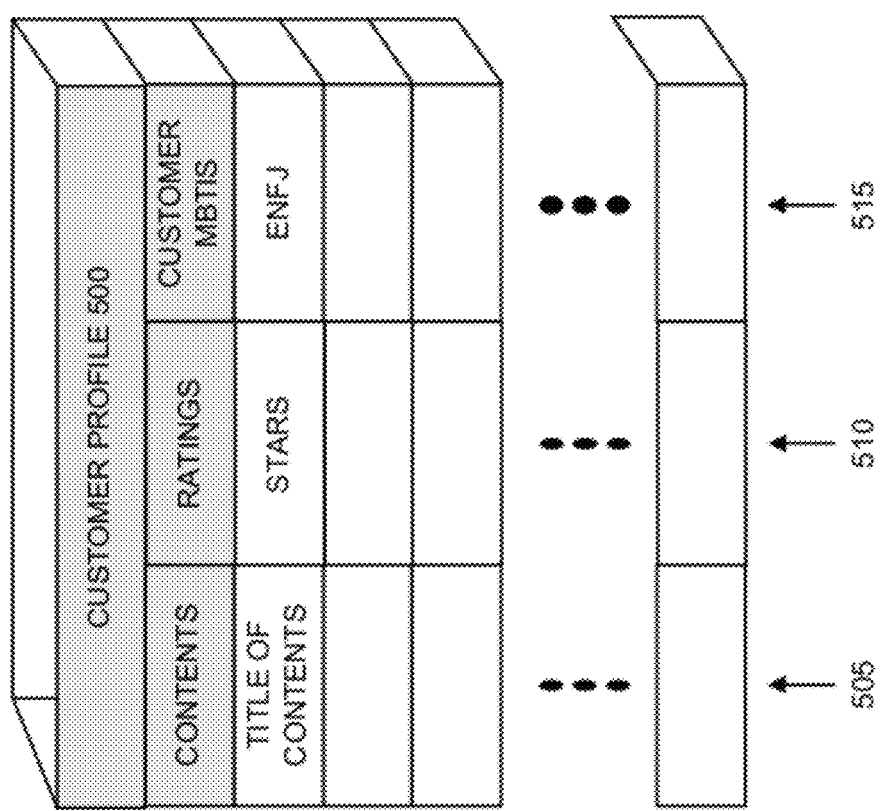
FIG. 5 is a diagram illustrating exemplary customer profile information.

Referring back to FIG. 3, customer profile repository 310 may store data and/or information pertaining to customers and their Myers-Briggs Type Indicators. FIG. 5 is a diagram illustrating an exemplary customer profile database 500. As illustrated, customer profile database 500 may include a contents field 505, a ratings field 510, and a customer Myers-Briggs Type Indicator field 515. According to other implementations, customer profile database 500 may include additional fields, fewer fields, or different fields. For example, customer profile database 500 may include a personality characteristic field indicating characteristic(s) attributed to the customer based on the customer's ratings of contents. Additionally, or alternatively, customer profile database 500 may include a weight field to indicate the strength of correlation between the characteristic(s) or the Myers-Briggs Type Indicator and the content that has been rated. While customer profile database 500 is depicted as a table, according to other implementations, customer profile database 500 may take the form of some other type of data structure.

Contents field 505 may include a string that indentifies the content rated by the customer. For example, the string may indicate the title of the content.

Ratings field 510 may include a string that indicates the customer's rating of the content indicated in contents field 505. For example, the string may indicate a star value or some other type of numerical value.

Customer Myers-Briggs Type Indicator field 515 may include a string that identifies a particular Myers-Briggs Type Indicator. Alternatively, MBTI-field 410 may include a string that identifies one or more of the personality characteristics (e.g., Introversion, etc.) that are included in a Myers-Briggs Type Indicator.

According to other embodiments, content personality identifier 110 may not use customer profile repository 310. For example, depending on the number of contents needed to identify the customer's MBTI and whether the customer completes the MBTI test within a single session, content personality classifier 110 may or may not store a partial completion of the customer's ratings of content. Rather, content personality classifier 110 may simply store the MBTI once the customer's MBTI is identified. Alternatively, the customer may be assigned an MBTI, but the customer wishes to take subsequent MBTI tests (e.g., either for entertainment purposes, to further investigate whether his/her MBTI is correct, etc.). According to such circumstances, content personality classifier 110 may use customer profile repository 310 to avoid displaying redundant content to the customer and/or to select content that would be most useful in identifying the customer's MBTI based on the content previously presented.

Figure 6A:
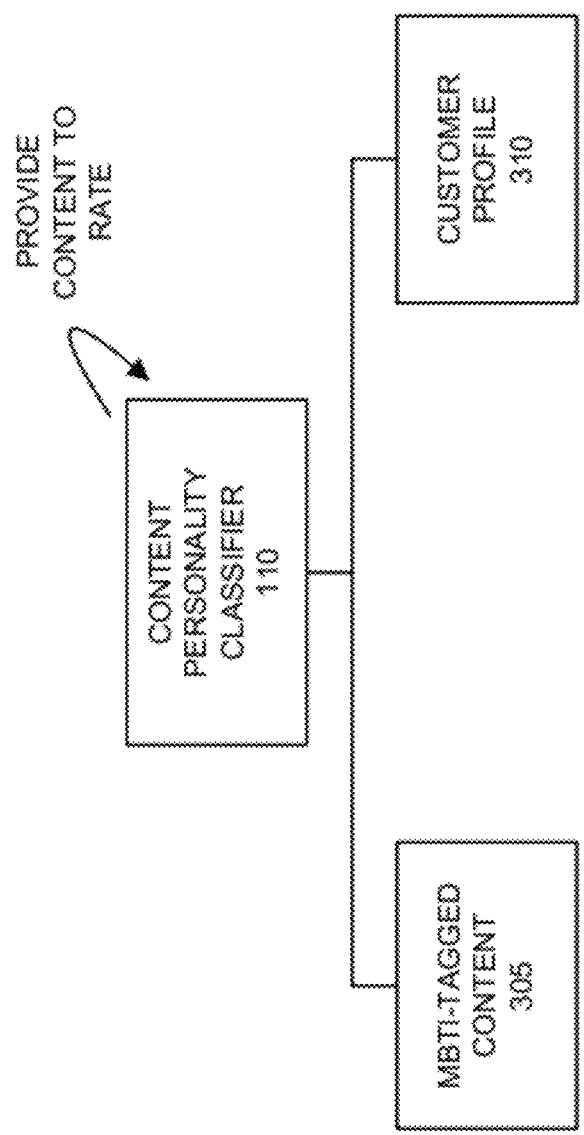
FIGS. 6A-6C are diagrams illustrating an exemplary process performed by an exemplary embodiment of the content personality identifier for identifying an MBTI of a customer.

Based on the repository data and/or information (e.g., MBTI-tagged content repository 305 and customer profile repository 310), content personality classifier 110 may identify a Myers-Briggs Type Indicator of a customer. For example, according to an exemplary process, as illustrated in FIG. 6A, content personality classifier 110 may provide a user interface to allow a customer to rate contents. For example, content personality classifier 110 may select contents from MBTI-tagged content repository 305 to present to the customer that wishes to learn his/her Myers-Briggs Type Indicator. By way of example, the user interface may display thumbnails or posters representative of the contents. The customer may then provide a rating to one or more of the displayed thumbnails or posters. In this example, it may be assumed that content personality classifier 110 may store the customer's ratings in customer profile 310 and the content rated.

Figure 6B:
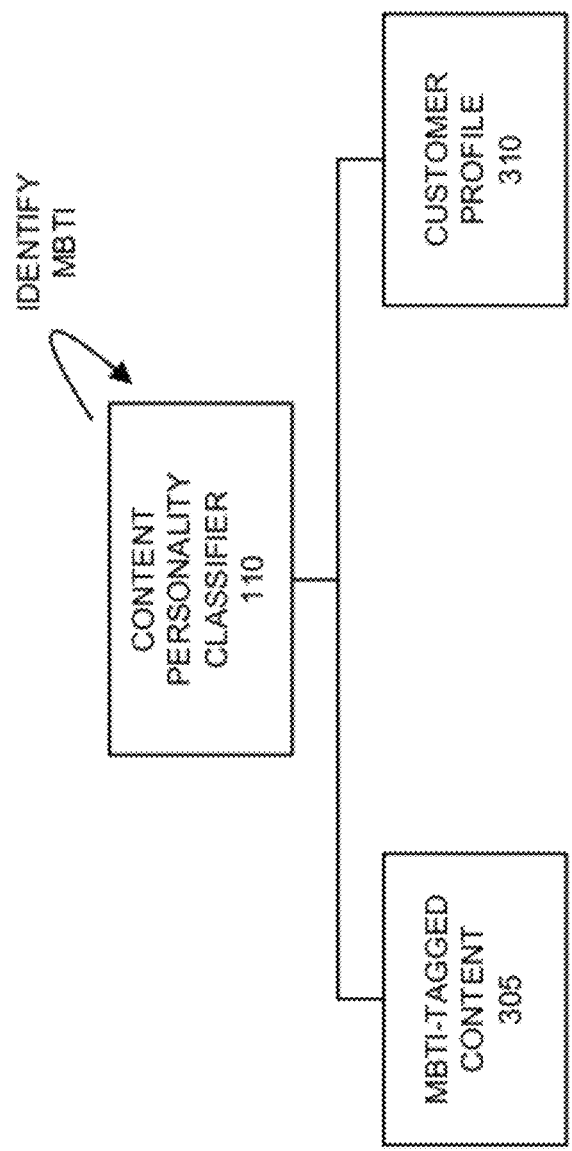
Figure 6C:
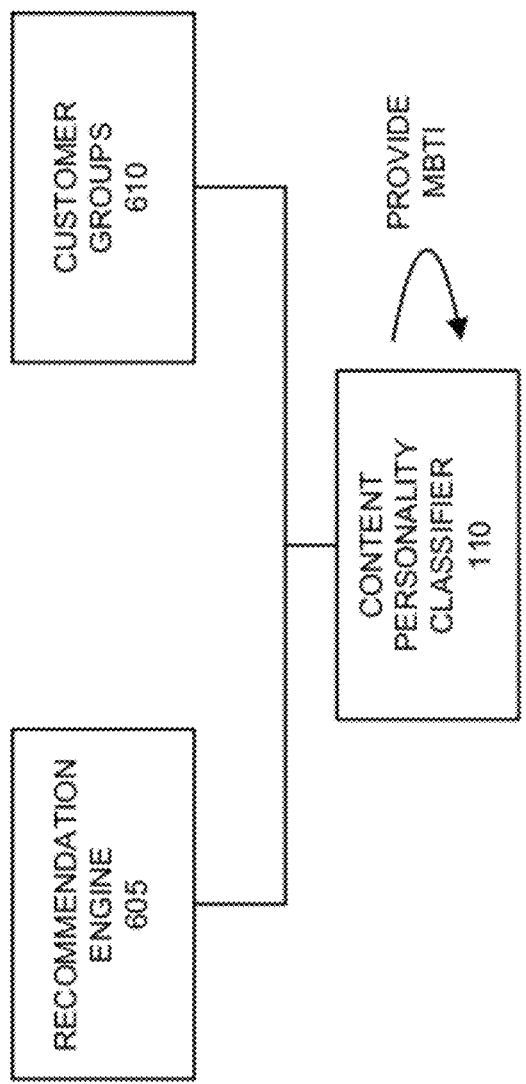

Based on the customer's ratings and the thumbnails or posters previously displayed, content personality classifier 110 may continue to select additional contents for the customer to rate until content personality classifier 110 is able to identify the customer's MBTI, as illustrated in FIG. 6B. According to an exemplary embodiment, content personality classifier 110 may select content randomly to provide a gaming element to the MBTI test. Alternatively, according to an exemplary embodiment, content personality classifier 110 may select content in a more optimal way based on the binary symmetry that exists relative to the personality characteristics, etc. As illustrated in FIG. 6C, when the customer's MBTI is identified, content personality classifier 110 may provide the MBTI to the customer and, to a recommendation engine 605 and/or a customer groups device 610. Recommendation engine 605 may recommend content to the customer based on the customer's MBTI. Customer groups device 610 may allow the customer to interact with other customers of like or similar MBTIs, etc., as previously described.

Figure 7A:
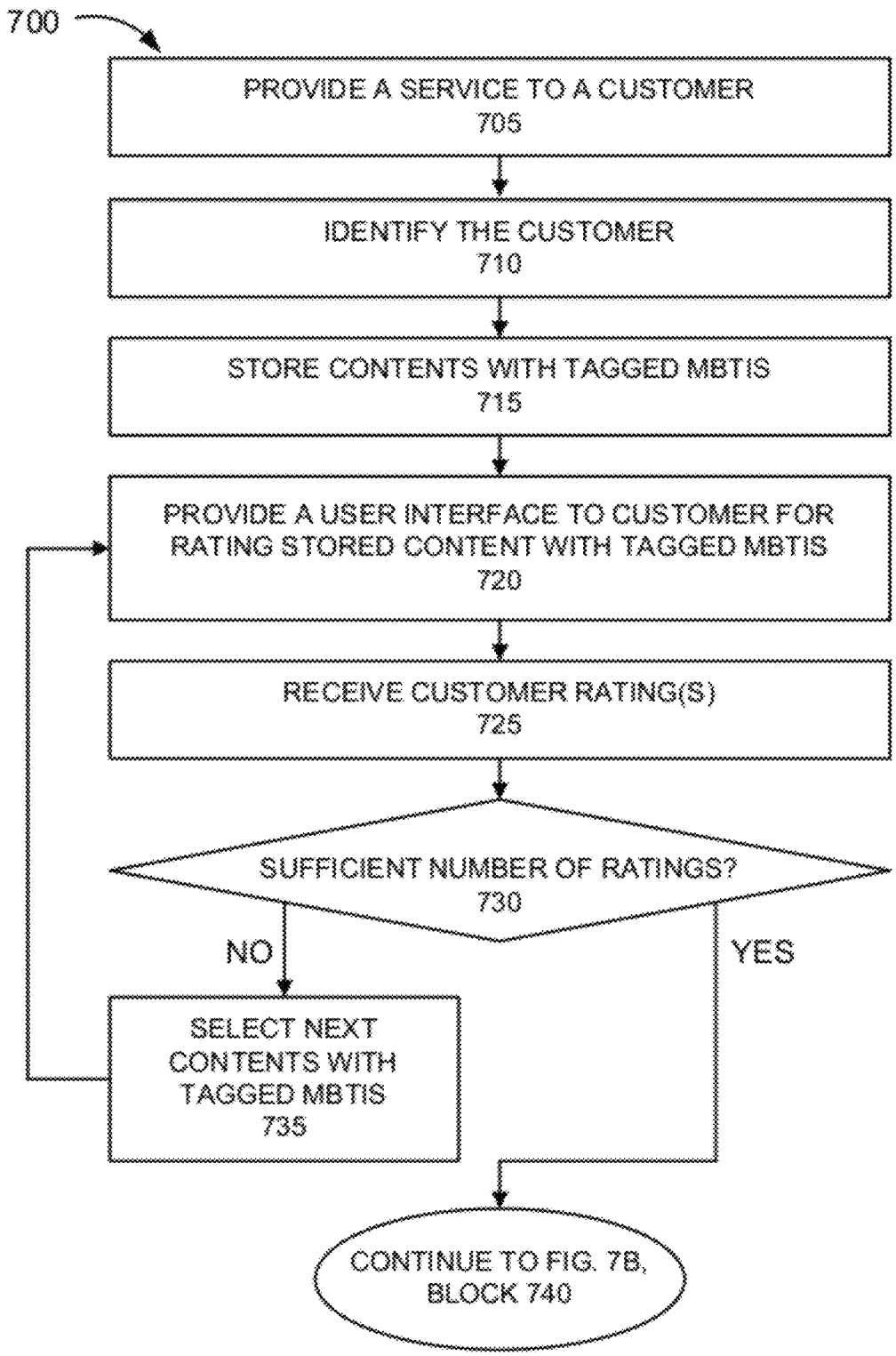
FIGS. 7A and 7B are flow diagrams illustrating an exemplary process for identifying an MBTI of a customer based on content ratings.
Figure 7B:
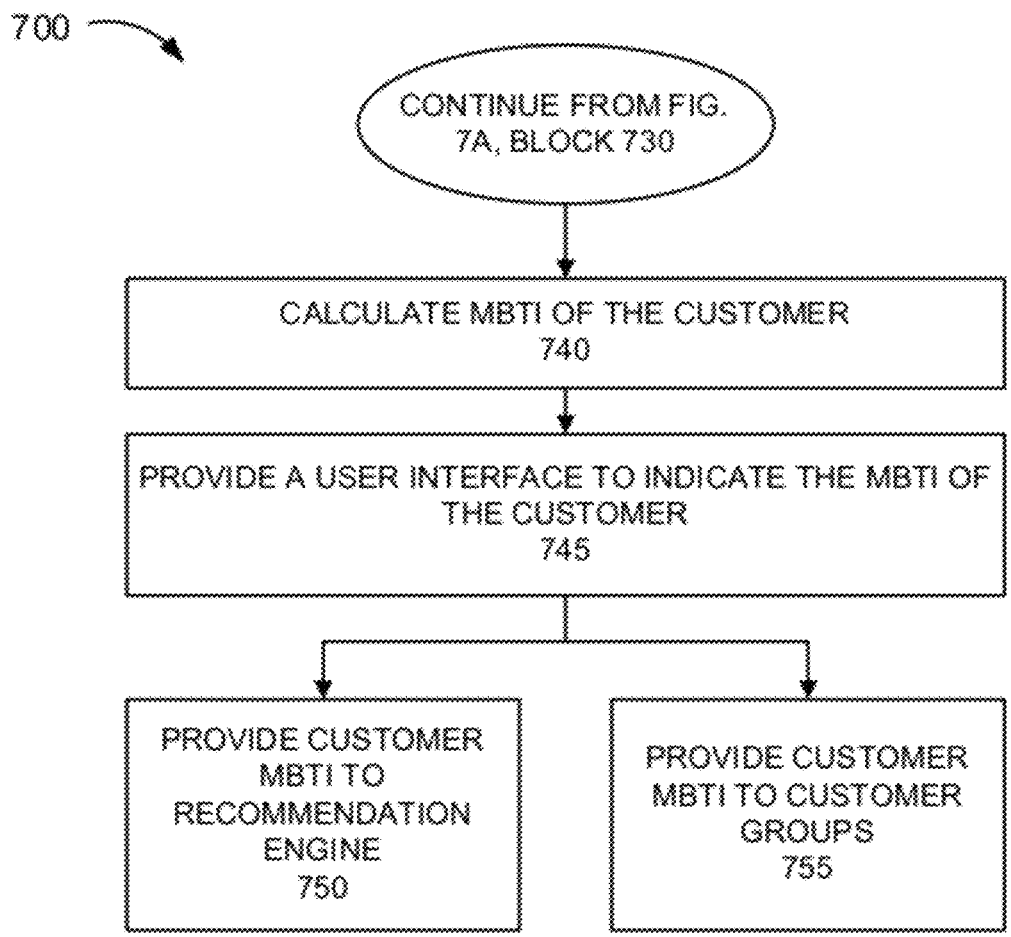

FIGS. 7A and 7B are flow diagrams illustrating an exemplary process 700 for identifying a Myers-Briggs Type Indicator of a customer based on content ratings. According to an exemplary embodiment, content personality classifier 110 and customer identifier 120 may perform process 700. For example, processing system 205 may execute an application 215 to perform the steps described.

Referring to FIG. 7A, in block 705, service provider network 105 provides a service to a customer. For example, service provider network 105 may provide a television service to the customer. Service provider network 105 may also provide other types of services (e.g., Internet and/or mobile service).

In block 710, customer identifier 120 identifies the customer. Customer identifier 120 may identify the customer automatically or based on manual input from the customer. As an example, when the customer uses his/her SPN TV interface device 160, a device identifier of the SPN TV interface device 160 may be obtained by customer identifier 120 to identify the customer. For example, the device identifier may be, for example, an equipment identifier and/or a network address (e.g., a media access control (MAC) address, an Internet Protocol (IP) address, etc.). Customer identifier 120 may identify the customer based on the device identifier. Additionally, or alternatively, when the customer uses his/her user device 170, a device identifier may be obtained. As an example, the customer may use user device 170 as a mobile remote (e.g., FIOS Mobile Remote) to control television service via SPN TV interface device 160. Customer identifier 120 may provide a customer identifier to content personality classifier 110.

In block 715, MBTI-tagged content repository 305 may store data and/or information pertaining to contents and their corresponding Myers-Briggs Type Indicators. In block 720, content personality classifier 110 may provide a user interface to the customer for rating the stored content with tagged-MBTIs. For example, content personality classifier 110 may provide a user interface that includes thumbnails or posters representative of contents and a rating system for the customer to rate the displayed thumbnails or posters.

In block 725, content personality classifier 110 may receive the customer's rating(s) of one or more of the stored contents. In block 730, content personality classifier 110 may determine whether a sufficient number of ratings have been received. For example, depending on the number of ratings needed to identify the customer's MBTI, the number of thumbnails or posters displayed to the customer at one time, the number of thumbnails or posters rated by the customer, etc.; content personality classifier 110 may determine whether additional thumbnails or posters need to be provided to the customer. As an example, if a thumbnail or poster receives a rating of five, then the MBTI (e.g., ISFJ) or personality characteristic(s) (e.g., I, IS, etc.) belonging to the thumbnail or poster is/are assigned this rating factor. In this way, each personality characteristic(s) or MBTI may accumulate a rating score, which may be used as a basis to determine whether a sufficient number of ratings have been obtained. If it is determined that additional ratings are needed to identify the customer's MBTI (block 730—NO), content personality classifier 110 may select additional contents with tagged MBTIs (block 735) and continue to block 720.

If it is determined that additional ratings are not needed to identify the customer's MBTI (block 730—YES), content personality classifier 110 may calculate the MBTI of the customer, as illustrated in FIG. 7B, block 740.

In block 745, content personality classifier 110 may provide a user interface to indicate the MBTI of the customer. For example, the content personality classifier 110 may indicate the MBTI of the customer and provide a description as to the meaning of the particular MBTI.

In block 750, content personality classifier 110 may provide the identified MBTI to recommendation engine 605, which may be used to assist in recommending content to the customer. In block 755, content personality classifier 110 may also provide a customer identifier to recommendation engine 605. In this way, recommendation engine 605 may provide the customer a personality-based content recommendation. Additionally, content personality classifier 110 may provide the identified MBTI to a social group server (e.g., a web site) to permit the customer to share his/her MBTI, interact with other customers, etc., as previously described.

Although FIGS. 7A and 7B illustrate an exemplary process 700 for identifying a Myers-Briggs Type Indicator for the customer based on content ratings, according to other embodiments, process 700 may include additional operations, fewer operations, and/or different operations than those illustrated in FIGS. 7A and 7B and described herein. For example, content personality classifier 110 may select MBTI-tagged content according to other selection processes.

By way of example, according to an exemplary embodiment, content personality classifier 110 may select, at random, at least one thumbnail or poster, for four of the MBTI types. Based on the customer's rating, the counterpart of the at least three MBTI types, which were not selected (i.e., rated), is displayed to the customer. In addition, another thumbnail or poster of the same MBTI type as the one with the maximum rating previously provided by the customer is displayed. This process may continue until a threshold value (e.g., star ratings) or a threshold number of thumbnails/posters belonging to a particular MBTI have been rated. Other approaches for selecting MBTI-tagged content and/or identifying the customer's MBTI not specifically described herein may be implemented, therefore this description is not intended to provide an exhaustive treatment.

Additionally, for example, according to other embodiments, depending on a customer's wishes, blocks 750 and/or 755 may be omitted. For example, customers' may use content personality classifier 110 as a gaming element. Additionally, for example, according to other embodiments, content personality classifier 110 may obtain information pertaining to contents the customer has viewed. Based on this information, content personality classifier 110 may recognize contents the customer has viewed and contents the customer has not viewed. Content personality classifier 110 may select contents to present to the customer based on this information. For example, content personality classifier 110 may use a weighting system in which content viewed and rated by the customer is given more weight when identifying the customer's MBTI or a personality characteristic(s) versus when the content is rated but has not been previously viewed the customer.

Additionally, while process 700 is described with reference to exemplary devices (e.g., customer identifier 120, content personality classifier 110), according to other embodiments, block(s) described in process 700 may be performed by a device or combination of devices other than those specifically mentioned.

The foregoing description of embodiments provides illustration, but is not intended to be exhaustive or to limit the embodiments to the precise form disclosed. Accordingly, modifications to the embodiments described herein may be possible. For example, other types of personality assessments may be implemented based on rating of content, such as, for example, the Realistic Investigative Artistic Social Enterprising Conventional (RIASEC) test or the Dominance Influence Steadiness Conscientiousness (DISC) test. These alternative tests may be used to further define or reinforce the personality assessment of a customer. Additionally, or alternatively, the MBTI of a customer may be automatically derived based on the contents selected by the customer. For example, contents viewed by the customer may be used as a basis to derive the customer's MBTI. Additionally, or alternatively, contents viewed and rated by the customer may be used as a basis to derive the customer's MBTI or other personality characteristic(s).

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The phrase "tangible readable medium" is intended to be broadly interpreted to include the readable mediums described in relation to memory/storage 210.

In addition, while a series of blocks has been described with regard to the process illustrated in FIGS. 7A and 7B, the order of the blocks may be modified according to other embodiments. Further, non-dependent blocks may be performed in parallel. Additionally, other processes described in this description may be modified and/or non-dependent operations may be performed in parallel.

An embodiment described herein may be implemented in many different forms of software, firmware, and/or hardware. For example, a process or a function may be implemented as "logic" or as a "component." The logic or the component may include hardware (e.g., processing system 205, etc.), a combination of hardware and software (e.g., application 215), a combination of hardware and firmware, or a combination of hardware, firmware, and software. An embodiment has been described without reference to the specific software code since the software can be designed to implement the embodiment based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   storing, by a processor, information associating each multimedia item, of a plurality of multimedia items, with one or more respective personality characteristics of a plurality of personality characteristics;
   selecting, by the processor, one or more multimedia items of the plurality of multimedia items;
   receiving, by the processor and from a customer, respective ratings of the selected one or more multimedia items;
   identifying, by the processor, a personality type for the customer based on:
      the one or more respective personality characteristics associated with each of the selected one or more multimedia items, and
      the respective ratings for the selected one or more multimedia items; and
   providing, by the processor, data identifying the personality type for display to the customer;
   wherein the plurality of personality characteristics relate to Myers-Briggs Type Indicators, and wherein selecting the one or more multimedia items further includes:
      receiving, from the customer, a selection of at least one multimedia item of the plurality of multimedia items;
      determining that none of the at least one multimedia items is associated with a first personality characteristic related to a particular Myers-Briggs Type Indicator of the Myers-Briggs Type Indicators; and
      selecting another multimedia item, of the plurality of multimedia items, to include in the selected one or more multimedia items, wherein the selected other multimedia item is associated with a second personality characteristic related to a Myers-Briggs Type Indicator counterpart of the particular Myers-Briggs Type Indicator.

* * * * *